US011861801B2

(12) United States Patent
Gurgul et al.

(10) Patent No.: US 11,861,801 B2
(45) Date of Patent: Jan. 2, 2024

(54) ENHANCED READING WITH AR GLASSES

(71) Applicant: Snap Inc., Santa Monica, CA (US)

(72) Inventors: Piotr Gurgul, Hergiswil (CH); Tomasz Zakrzewski, Lachen (CH)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/651,147

(22) Filed: Feb. 15, 2022

(65) Prior Publication Data
US 2023/0215107 A1 Jul. 6, 2023

Related U.S. Application Data

(60) Provisional application No. 63/295,460, filed on Dec. 30, 2021.

(51) Int. Cl.
*G06T 19/00* (2011.01)
*H04W 4/80* (2018.01)
*G06F 3/01* (2006.01)

(52) U.S. Cl.
CPC .......... *G06T 19/006* (2013.01); *G06F 3/017* (2013.01); *H04W 4/80* (2018.02)

(58) Field of Classification Search
CPC ......... G06T 19/006; G06F 3/017; H04W 4/80
See application file for complete search history.

(56) References Cited

U.S. PATENT DOCUMENTS

| | | | | |
|---|---|---|---|---|
| 5,170,159 | A * | 12/1992 | Kawabata | G04G 15/00 348/730 |
| 6,553,501 | B1 * | 4/2003 | Yokoe | G06F 1/3203 713/320 |
| 7,971,156 | B2 | 6/2011 | Albertson et al. | |
| 8,581,844 | B2 * | 11/2013 | Ho | G06F 1/1626 345/158 |
| 8,922,487 | B2 * | 12/2014 | Ho | G06F 3/011 345/158 |
| 9,094,539 | B1 * | 7/2015 | Noble | H04N 7/00 |
| 9,225,897 | B1 | 12/2015 | Sehn et al. | |

(Continued)

OTHER PUBLICATIONS

"International Application Serial No. PCT/US2022/052828, International Search Report dated Apr. 21, 2023", 4 pgs.

(Continued)

*Primary Examiner* — Motilewa Good-Johnson
(74) *Attorney, Agent, or Firm* — Schwegman Lundberg & Woessner, P.A.

(57) ABSTRACT

Systems, methods, and computer readable media for enhanced augmented reality (AR) reading are provided, where the methods include entering a reading mode, capturing an image of a section of reading materials such as a page of a book, identifying a code within the image, and identifying a code module corresponding to the code. The methods further include executing the code module, the code module providing an augmented reality object or virtual reality object related to an object depicted on the section or page, entering a sleep mode for a sleep duration based on an estimated reading time duration of a section or page, awaking after the sleep duration, and capturing a next image. The sleep duration is adjusted based on times when identifiers of the sections of the reading materials such as numbers are captured. The user may manually wake the AR reading device using an external user interface.

20 Claims, 16 Drawing Sheets

(56) References Cited

U.S. PATENT DOCUMENTS

| | | | |
|---|---|---|---|
| 9,239,618 B2* | 1/2016 | Cho | G06F 3/013 |
| 9,276,886 B1 | 3/2016 | Samaranayake | |
| 9,317,486 B1* | 4/2016 | Story, Jr. | G06F 3/0487 |
| 9,541,986 B2* | 1/2017 | Rohrweck | G06F 1/3234 |
| 9,595,115 B1* | 3/2017 | Cederlof | G06T 7/20 |
| 9,705,831 B2 | 7/2017 | Spiegel | |
| 9,742,713 B2 | 8/2017 | Spiegel et al. | |
| 9,805,511 B2* | 10/2017 | Hintermeister | G06F 3/0481 |
| 9,883,110 B2* | 1/2018 | Martin | G06F 3/011 |
| 10,043,407 B2* | 8/2018 | Murdock | G06F 3/167 |
| 10,102,423 B2 | 10/2018 | Shaburov et al. | |
| 10,268,175 B2* | 4/2019 | Sugama | G06K 7/10712 |
| 10,270,985 B2* | 4/2019 | Kamhi | H04N 21/4223 |
| 10,284,508 B1 | 5/2019 | Allen et al. | |
| 10,387,570 B2* | 8/2019 | VanBlon | G06F 40/30 |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,614,855 B2 | 4/2020 | Huang | |
| 10,748,347 B1 | 8/2020 | Li et al. | |
| 10,777,019 B2* | 9/2020 | Feng | G06F 3/011 |
| 10,817,582 B2* | 10/2020 | Brown | G06F 16/954 |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 2012/0262486 A1* | 10/2012 | Raghoebardajal | G06T 19/006 345/633 |
| 2012/0324213 A1* | 12/2012 | Ho | G06F 3/011 713/100 |
| 2013/0171603 A1* | 7/2013 | Self | G09B 5/065 434/317 |
| 2013/0307855 A1 | 11/2013 | Lamb et al. | |
| 2014/0071166 A1* | 3/2014 | Ho | G06T 19/006 345/633 |
| 2014/0108842 A1* | 4/2014 | Frank | G06F 1/3212 713/323 |
| 2014/0210710 A1* | 7/2014 | Shin | G06F 3/011 345/156 |
| 2015/0123966 A1* | 5/2015 | Newman | G06T 19/006 345/419 |
| 2015/0316983 A1 | 11/2015 | Park et al. | |
| 2017/0134553 A1* | 5/2017 | Jeon | H04W 4/08 |
| 2020/0143773 A1* | 5/2020 | Tholfsen | G06V 30/40 |
| 2020/0334914 A1 | 10/2020 | Haines | |
| 2021/0011612 A1 | 1/2021 | Dancie et al. | |
| 2021/0074016 A1 | 3/2021 | Li et al. | |
| 2021/0166732 A1 | 6/2021 | Shaburova et al. | |
| 2021/0241529 A1 | 8/2021 | Cowburn et al. | |
| 2021/0303075 A1 | 9/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2022/0245574 A1* | 8/2022 | Cella | G06F 9/451 |
| 2022/0413047 A1* | 12/2022 | Jiang | G01R 31/318597 |
| 2023/0020265 A1* | 1/2023 | Min | H04W 48/16 |

OTHER PUBLICATIONS

"International Application Serial No. PCT/US2022/052828, Written Opinion dated Apr. 21, 2023", 8 pgs.

* cited by examiner

FIG. 10

ENHANCED READING WITH AR GLASSES

CLAIM OF PRIORITY

This application claims the benefit of priority to U.S. Provisional Application Ser. No. 63/295,460, filed on Dec. 30, 2021, which is incorporated herein by reference in its entirety.

TECHNICAL FIELD

Examples of the present disclosure relate generally to enhanced reading with augmented reality (AR) glasses. More particularly, but not by way of limitation, examples of the present disclosure relate to reducing power needed to provide enhanced reading where AR modules are launched based on codes embedded in reading materials such as a book, magazine, news paper, and so forth.

BACKGROUND

As the popularity of virtual reality (VR), mixed reality (MR), and augmented reality (AR) systems continues to grow, users increasingly want to interact with virtual media content items in the mixed reality and VR environment. However, providing the virtual media content can be power intensive particularly for wearable devices such as AR glasses. Additionally, determining which or what virtual media content the user would Like to be provided for a particular context is increasingly difficult to determine as the availability of virtual media content increases.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 10 illustrates a book with codes, in accordance with some examples.

DETAILED DESCRIPTION

Figure 1:
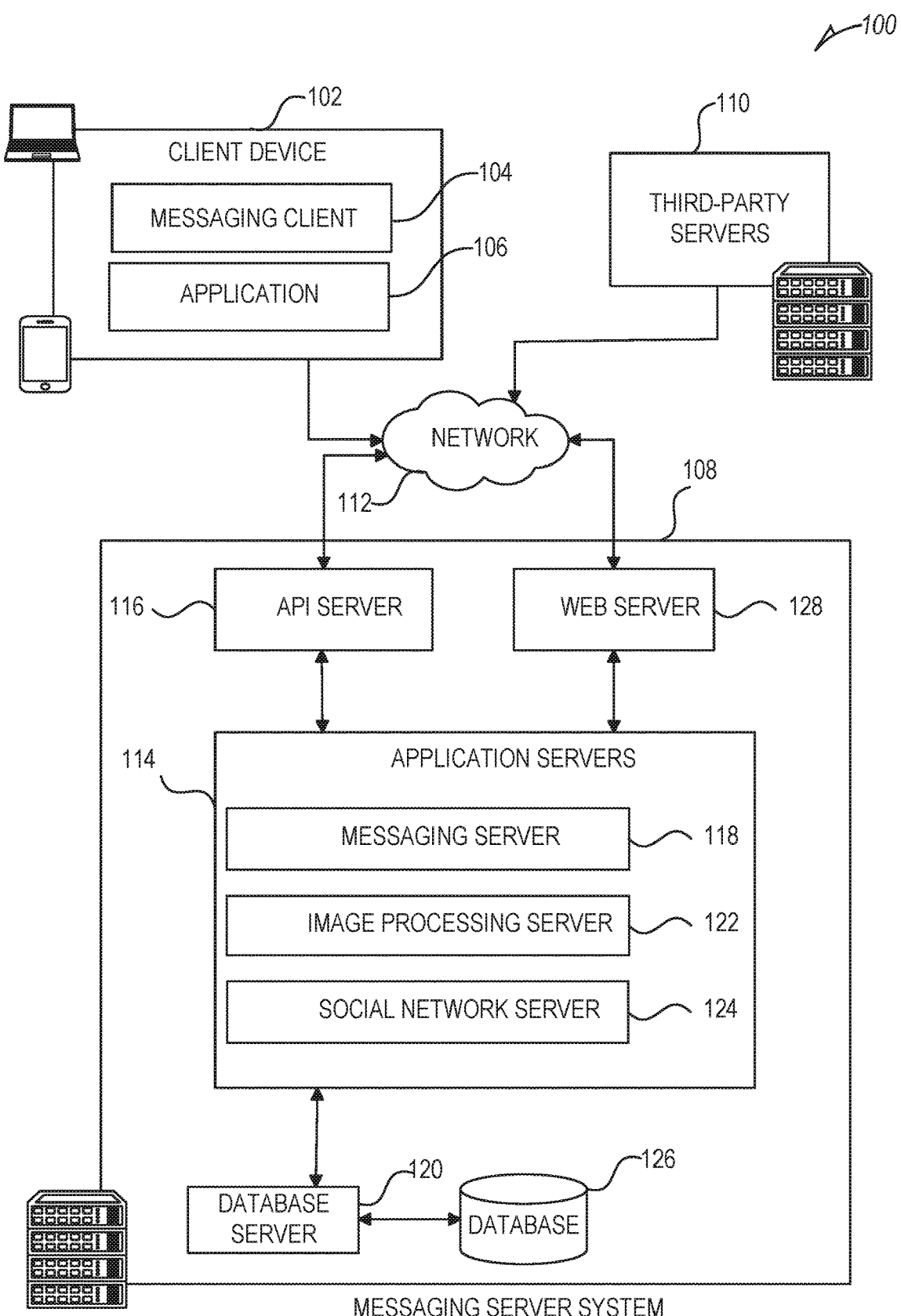
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Reading is still an important and popular activity. In some examples, printed codes are added that enable an enhanced reading experience, where the printed codes are printed in traditional printed media (e.g., paper books, magazines, etc.) or included in electronic media (e.g., electronic books, electronic magazines, etc.) and enable the reader to seamlessly experience virtual objects overlaid in the physical world while reading. The reader uses a wearable electronic device such as AR glasses that identify the printed codes included in the text and seamlessly provides virtual objects within a mixed reality environment for the reader to interact with while reading. A code module is associated with each printed code and the AR glasses match the printed code to the code module and execute the code module. The code module is often highly contextualized to text or an image included in a written material (e.g., on the page of a book). The code module provides virtual objects and a mixed reality interaction for the reader of the written material. For example, if a reader is reading a textbook on gases, a code module may provide virtual gas molecules where the user can interact with the supersized gas molecules to understand the relationship between volume and pressure.

AR glasses, though, have a limited battery life compared with the time that many people spend reading materials such as books. For example, often the battery life of AR glasses with displays and being actively used is 30 minutes or less. Additionally, readers often find that it is burdensome to turn AR glasses on and off many times while reading.

Accordingly, there is a technical problem of how to provide a mixed reality experience to a reader of printed material that includes printed codes with AR glasses that have limited battery life. Examples address this technical problem by providing a reading mode for the AR glasses that causes the AR glasses go to sleep, or portions of the AR glasses to go to sleep, and wake up at intervals to capture images of subsequent sections of a written material (e.g., pages of the book). The AR glasses then identify any printed codes in each section of the written material and execute associated code modules. The AR glasses may adjust a sleep tune to learn the reading habits of the reader. By putting displays and other components of the AR glasses to sleep and waking them up to scan for codes, the battery life of the AR glasses may be extended to last for several hours or more, which is typically long enough for an average user when reading. As a result, the functioning of the AR glasses is greatly improved. Moreover, the AR glasses limit other features of the AR glasses during the reading mode in order to reduce energy consumption.

Additionally, the code modules may require a lot of energy to download to the AR glasses from a backend server. The communication hardware and software of the AR glasses consume a great deal of energy. Examples address this technical problem by managing the downloading of the code modules. In some examples, the code modules for an entire written material are downloaded to the AR glasses at once when the AR glasses have a good signal with a host or backend and then the communication hardware of the AR glasses are put into a sleep mode to conserve energy. In some examples, the AR glasses download the code modules for an entire written material so that the AR glasses do not have to connect with another device while the a users is reading the written material. In some examples, the AR glasses use low-energy communication protocols to download the code modules to conserve energy. In some examples, the communications hardware is kept in a sleep mode and awakened to download code modules when needed.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories OF galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
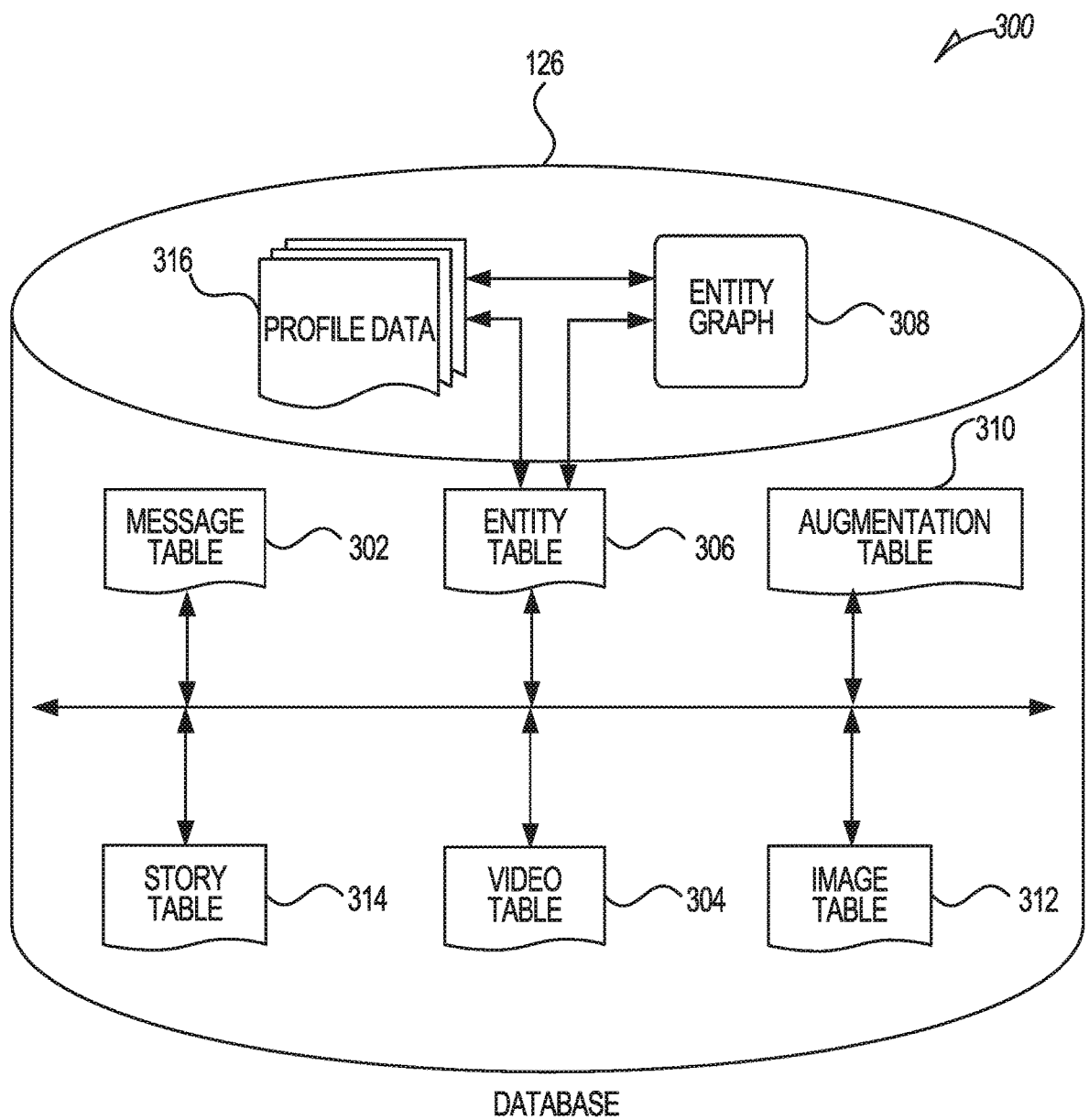
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface)

System Architecture

Figure 2:
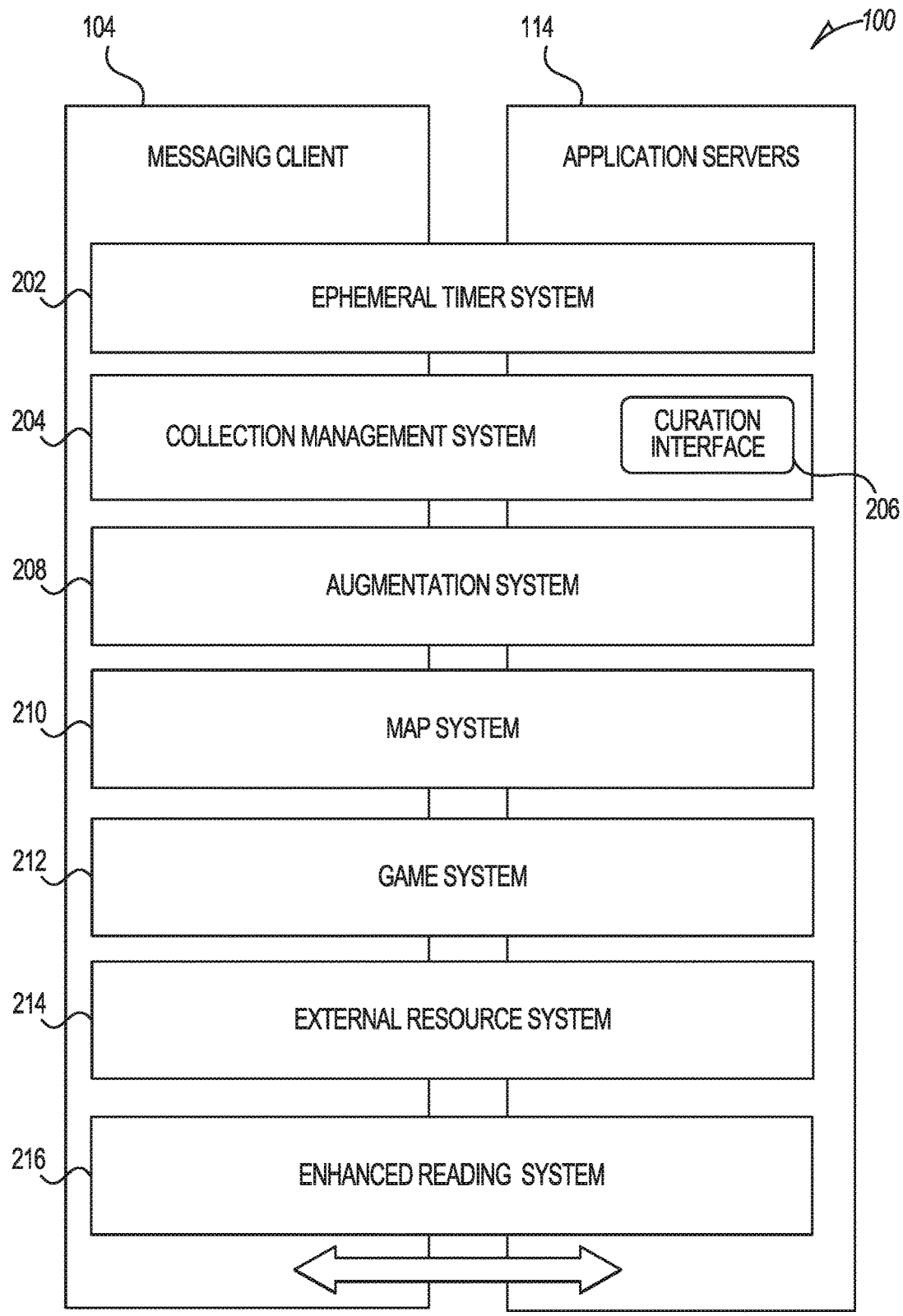
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an enhanced reading system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, e.g., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing section of reading materials such as a page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an ORuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The enhanced reading system 216 provides functions and routines for providing enhanced augmented reality book reading. The enhanced reading system 216 provides the functions and routines as described herein and in FIG. 6. The enhanced reading system 216 captures images of sections of reading material, e.g., pages of a book, as it is being read and detects quick response codes or codes in the book that correspond to code modules that provide a mixed reality experience for the sections of reading material, e.g., page of the book. The enhanced reading system 216 retrieves the code modules and executes the code modules. The enhanced reading system 216 provides power-saving features such as going into a sleep mode and waking up to execute the code modules. The enhanced reading system 216 may retrieve all the code modules for a book prior to reading and then cause the communications hardware and software to go into a sleep mode to save power.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data, Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college OF university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302, Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
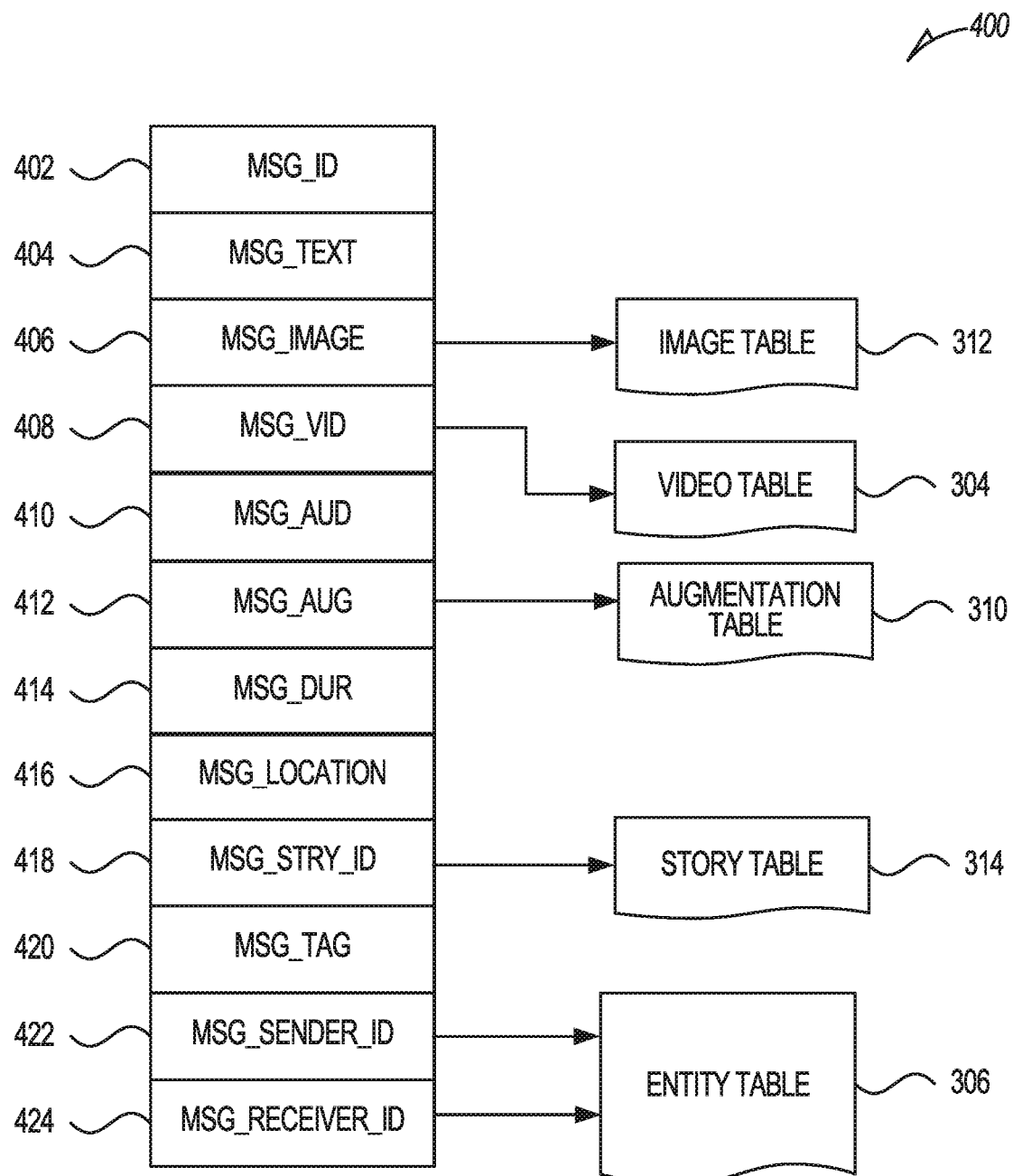
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310,
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
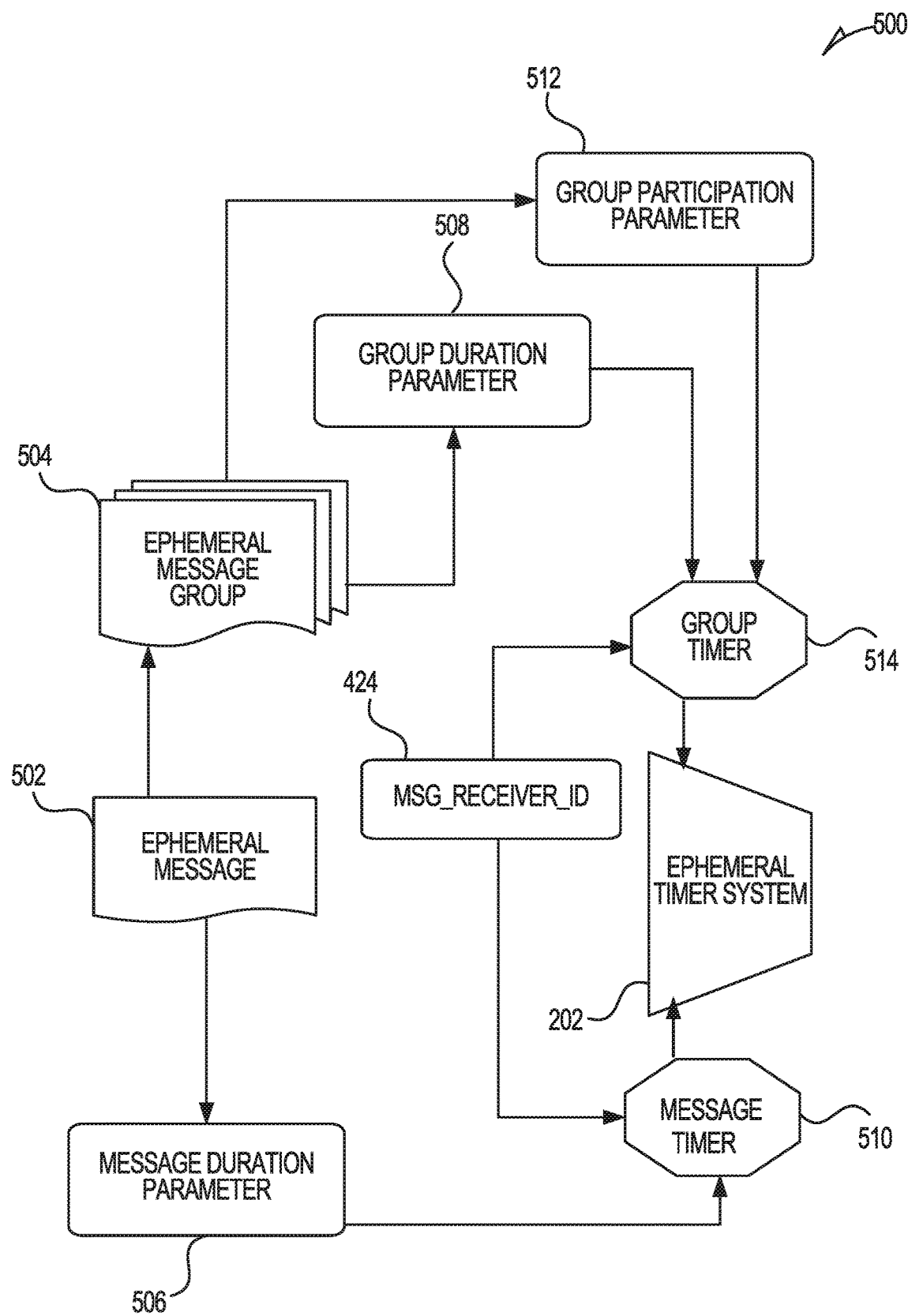
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512, Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral tuner system 202 determines that the message duration parameter 506 for a particular ephemeral message 502 has expired, the ephemeral timer system 202 causes the messaging client 104 to no longer display an indicium an icon or textual identification) associated with the ephemeral message 502.

Enhanced Book Reading with AR Glasses

Figure 6:
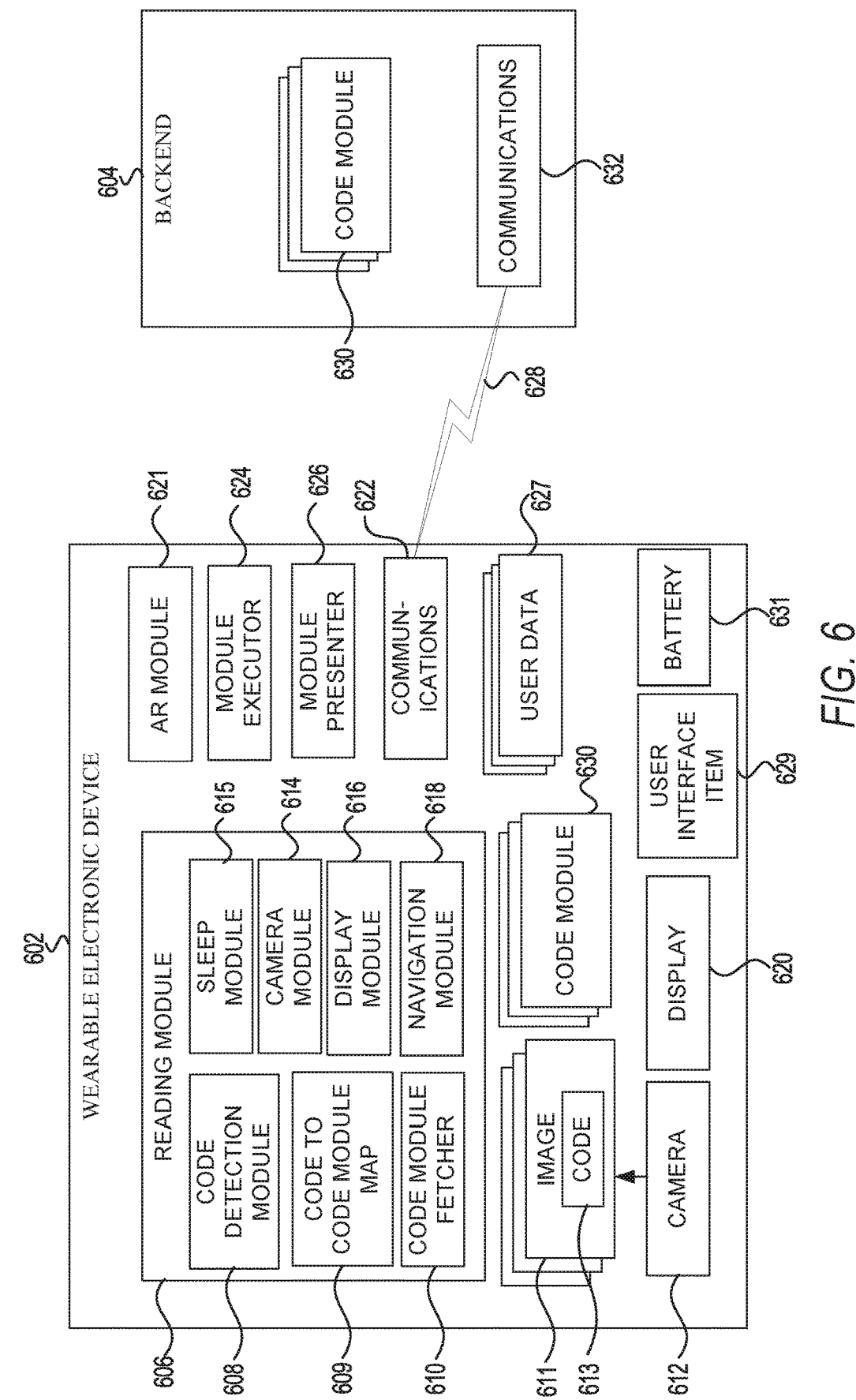
FIG. 6 illustrates a system for enhanced reading with AR glasses, in accordance with some examples.

FIG. 6 illustrates a system 600 for enhanced book reading with AR glasses, in accordance with some examples. The system 600 includes wearable electronic device 602 and a backend 604. The wearable electronic device 602 may be the glasses 1100. The VR module 621 of the wearable electronic device 602 provides a mixed reality or augmented reality experience for the user. For example, images may be projected on the lenses or display 620 of the glasses 1100. Additionally, the camera 612, for example cameras 1169 of FIG. 11, captures images of the real environment and the VR module 621 uses this information to provide a VR interactive environment. For example, the hands of the person using the wearable electronic device 602 are projected on the display 620 and the person may interact with the virtual images presented on the display 620. The display 620 includes display hardware and software and/or firmware to control the display. The display 620 is transparent so the user can see both the images presented on the display as well as the real world objects that are visible through the display.

The module executor 624 runs or executes modules such as the books module 606 on the wearable electronic device 602. The module presenter 626 is a module that presents other modules for execution by the module executor 624. The communications 622 is wireless communications hardware and software for communicating with the backend 604. For example, the communications 622 includes an antenna and software or hardware to implement communication protocols such as IEEE 802.11 or Blue Tooth®. The communications 622 may include processing circuitry that is configured to implement one or more communication protocols and control transceiver circuitry that is coupled to the processing circuitry and an antenna.

The reading module 606 adds enhancements for reading physical books. The reading module 606 includes or may call code detection module 608, camera module 614, display module 616, navigation module 618, and code module fetcher 610. The code detection module 608 takes an image and determines whether there is a depiction of a code 613 such as code 902, 1002, and 1004 within the image 611 or whether the image 611 contains a code 613, which may be termed a printed code, QR code, Snapcode®, or another name. The camera module 614 controls or causes the camera 612 to capture an image and make it available for other modules. The camera 612 is camera hardware and software or firmware to control the camera 612. The display module 616 displays or causes to be displayed text and images for a user of the wearable electronic device 602. The navigation module 618 manages the execution of code modules 630, which may reside on the wearable electronic device 602 and/or the backend 604. The code modules 630 correspond to codes 613 that the code detection module 608 detects. The code to code module map 609 provides a mapping from codes to code module 630. The code modules 630 include a recommended sleep time or duration between sections of reading material, e.g., pages, in accordance with some embodiments. The reading module 606 causes the camera module 614 to capture an image 611. The reading module 606 causes the code detection module 608 to determine if there are codes 613 in the image 611. If there are codes 613 in the image 611, then the reading module 606 determines which code module 630 to cause the module executor 624 to execute in response to the code 613 being present in the image 611. In some examples, the reading module 606 decodes the code 613 and sends the information encoded in the code 613 to the backend 604. The backend 604 determines which code module 630 should be executed based on the information encoded in the code 613, in some examples, the code 613 indicates an entire reading material, such as an entire book, which corresponds to a number of code modules 630. In some examples, the reading module 606 refrains from turning on display hardware unless the code 613 is identified or a physical user interface item 629 is selected. The camera 612, display 620, and communications 622 have a low-energy consumption mode where either a portion of the circuitry has power lowered or turned off or the entire circuitry has its power lowered or turned off. In some examples, camera 612, display 620, and communications 622 each include at least two different circuits where one circuit has power keep to the circuit for turning on and off the remaining circuitry. The camera 612, display 620, and communications 622 can be placed in a low power or lower power mode by turning off the circuitry except for the low power circuit. The low power mode puts the hardware in a low energy consumption mode.

Figure 9:
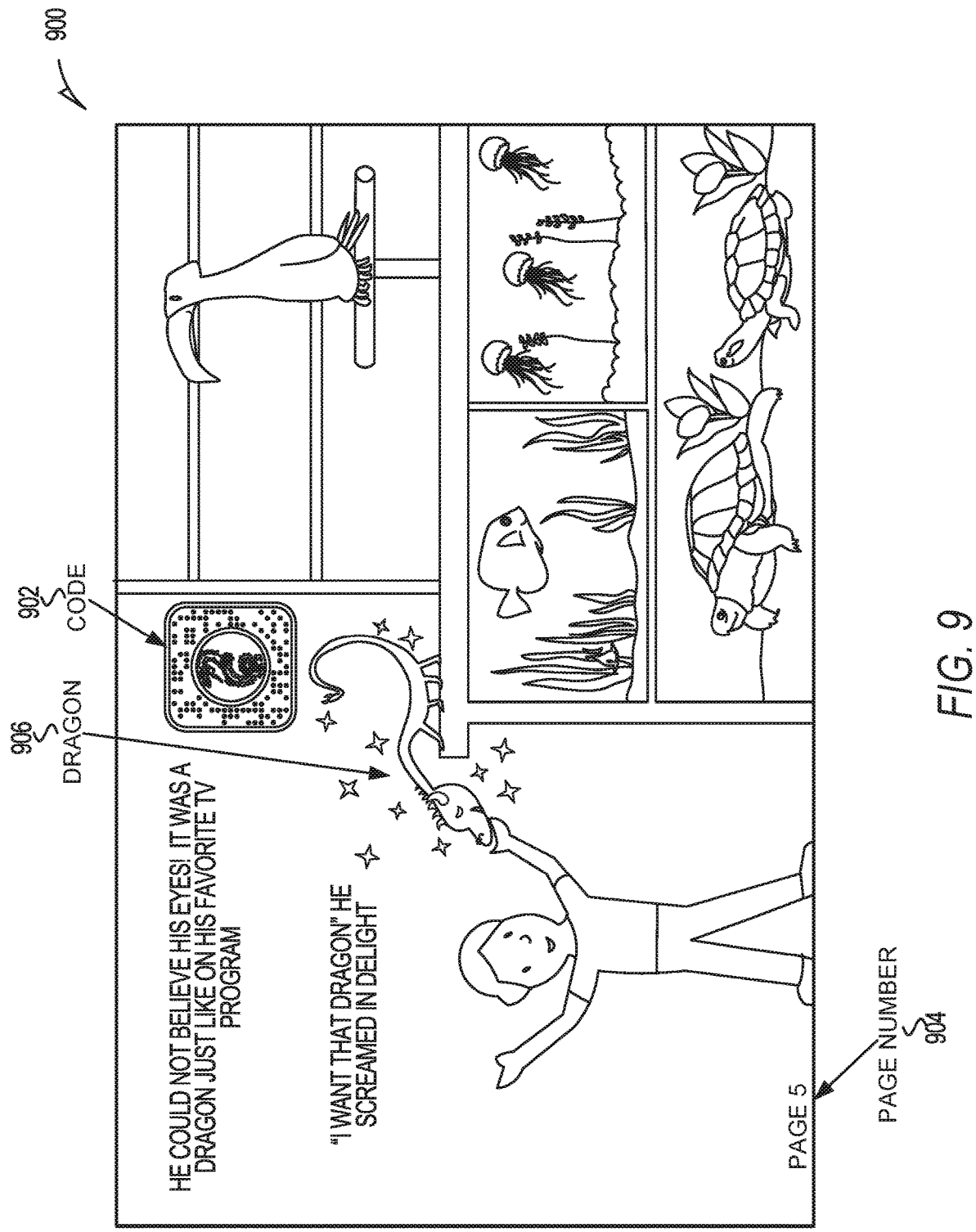
FIG. 9 illustrates a book with codes, in accordance with some examples.

In some examples, the code modules 630 provide a mixed reality experience where an initial location of virtual reality objects is related to the objects depicted on the section of the readming material, such as a page of the book, in the image 611, For example, referring to FIG. 9, the code module 630 corresponding to code 902 initially depicts a virtual reality dragon in the location of the dragon 906 where the VR or AR dragon then flies off the page of the book. The code module 630 may access the camera module 614 to provide a live image of the section of the reading material, e.g. a page of a book, which is augmented with VR objects and interactive UI elements or items. In other embodiments, the code module 630 presents AR objects and interactive UI elements or items so that the user sees them on a screen as well as seeing the real world objects through the screen. In some embodiments, the AR objects and interactive UI elements or items are projected on the eye of the user.

In response to detecting that the code 613 corresponds to a piece of reading material, e.g., a book, the code module fetcher 610 checks if the code modules 630 associated with the code are preloaded at to the wearable electronic device 602. If so, the code module fetcher 610 may access the code modules 630 locally from the wearable electronic device 602. Alternatively, if the code modules 630 are not preloaded, the code module fetcher 610 may make a request for the code modules 630 from the backend 604. In some examples, the code module fetcher 610 requests some or all of the code modules 630 for a piece of reading material, e.g., a book, when the code module fetcher 610 determines that a particular book is being read, which may be inferred from the image 611 comprising a code 613 that indicates the a piece of reading material, e.g., book. In some examples, the code module fetcher 610 waits to load a code module 630 from the backend 604 until the code 613 corresponding to the code module 630 has been detected in the image 611. The code module fetcher 610 may cache code modules 630 at the wearable electronic device 602 based on knowing which piece of reading material, e.g., book, is being read. For example, the code module fetcher 610 may request the next several code modules 630 after a code module 630 corresponding to a code 613 that has been detected.

The module executor 624 takes the selected code module 630 and executes it. The navigation module 618 may be executed with the code module 630 to manage the code module 630 exiting and returning back to the reading module 606. The code module 630 provides a mixed reality experience for the reader of a piece of reading material, e.g., book. The a piece of reading material, e.g., book, may be a physical such as paper or may be a reading material that is being electronically read. The mixed reality experience includes six degrees of freedom in accordance with some examples. The mixed reality experience includes interactive objects such as user interface objects. The user may terminate the code module 630 or the code module 630 may timeout. The navigation module 618 determines when there is a timeout and returns control to the reading module 606 when there is a timeout.

User data 627 is collected for how the user is reading the reading material, e.g., book. Some of the data that may be collected is how often a section of reading material is changed, e.g., a page is turned for a book, whether the user interacted with a code module 630, how often the user reads, and so forth. The user data 627 is stored collectively to protect privacy, in accordance with some examples. The user data 627 is encrypted to protect privacy, in accordance with some examples.

The reading module 606 detects when reading material, e.g., book, is no longer being read based on the images 611. For example, the images 611 may no longer include the reading material, e.g., book, which may be used to infer that the reading material, e.g., book, is no longer being read. The image 611 may be of a different piece of reading material, e.g., a different book, in which case the reading module 606 may determine to exit or to scan the image 611 for codes 613. The reading module 606 may be executed or selected by the user.

The user interface item 629 is a means for the user of the wearable electronic device 602 to interact with the wearable electronic device 602. In some examples, the user interface item 629 is an external button.

Reading mode, e.g., a book rading mode, can be selected from a module carousel 1214 and causes the remaining user interface to stop being displayed. The wearable electronic device 602 enters a mode where the display 620 is turned off to conserve the battery 631. The reading module 606 is executing and non-essential services are shutdown.

The sleep module 615 will periodically request that the camera module 614 controls the camera 612 to capture an image 611 or frame. In some examples, the sleep module 615 will request that the camera module 614 capture an image 611 from the camera every 15 seconds, which corresponds to ⅛th of the time spent on average on a page of text of a book. The code detection module 608 then checks the image 611 for codes 613. If no codes 613 are found, the image 611 is discarded. If code detection module 608 detects a code 613, then the code to code module map 609 looks to see if a corresponding code module 630 is loaded in the wearable electronic device 602. If the code module 630 is not loaded, then the code module fetcher 610 manages retrieving the code module 630 from the backend 604 via the communications 622 by sending packets or communications 628 to the backend 604.

In some examples, the sleep module 615 places the hardware of the AR glasses into a sleep state for a sleep duration or sleep time where user interface item 629 selections are still recognized and where a timer or interrupt circuit is still powered to awake the wearable electronic device 602. In some examples, the sleep module 615 places the display 620 and camera 612 hardware into a low power consumption state. The sleep time or sleep duration is based on an amount of time to read a section of reading material, e.g., a page of a book, with a goal of awaking once for every section of the reading material, e.g., page of the book. The sleep time or sleep duration is an estimate of the reading time of a section of reading material, e.g., page of the book, and may be from less than a second to several minutes. The sleep time or sleep duration may be adjusted depending on the reading habits of the user. The sleep module 615 may determine to enter a sleep mode based on the code module 630 reporting an explicit user input to exit the code module 630, a timeout period where the user has not interacted with the code module 630 for a predetermined duration of time, or if the code module 630 detects that the user has turned to a different section of reading material, e.g., page, or is no longer focused on the book. The code module 630 may use the camera 612 during operation to provide a mixed reality experience and may be responsible for ensuring that the user is still focused on the same section of the reading material, e.g., page of the hook.

The sleep module 615 puts the communications 622 into a sleep mode after the code modules 630 have been retrieved for a piece of reading material, e.g., a book, until the reading mode, e.g., book reading mode, is exited or another piece of reading material, e.g., a book, is determined to be within an image 611. The sleep module 615 may power down the communications 622 and then power up the communications 622 when the reading mode, e.g., book reading mode, is exited. In some examples, the communications 622 have a low power mode where power is maintained to a portion of the circuitry to permit high-priority communications but that requires powering up the remainder of the communications 622 prior to use.

If a code module 630 is matched to the code 613, then the display module 616 turns the display 620 on and the navigation module 618 launches the code module 630. The reading module 606 is paused while the code module 630 executes or runs. When the user is finished with the code module 630 the navigation module 618 terminates the code module 630 and returns to the reading module 606. The user may indicate they are done with the code module 630 via an interaction with the code module 630 such as a hand gesture, a timeout, or another interaction such as with the user interface item 629.

The sleep module 615 may use different times to wake up and request that the camera module 614 capture an image. The sleep module 615 is configured to wake-up when the user interface item 629 is selected, in accordance with some examples. For example, a button on a side of the glasses 1100 may wake-up the sleep module 615.

For example, fifteen seconds may be too long for the sleep module 615 to wake-up. The sleep module 615 may adjust the time for waking up based on user data 627. In some examples, the code detection module 608 determines a section of reading material, e.g., page of the book, that is being read and stores this in the user data 627. If the page numbers are not sequential, for example, a first page is page 2 and a second page is page 4, then the sleep module 615 may reduce the wake-up time to 5 seconds to ensure that every page is captured by an image 611 to search for codes 613. In some examples, the code 613 is associated with a page of the book so that sleep module 615 can determine if sections of reading material, e.g., pages, have been skipped from being captured by the camera module 614. The sleep module 615 reduces the sleep time if pages are being skipped.

The sleep module 615 enables the wearable electronic device 602 to sleep and be more energy-efficient since an image 611 is captured only once every 15 seconds or so, and the wearable electronic device 602 can go into a sleep mode when it is not capturing and analyzing images 611.

Having the code detection module 608 resident in the wearable electronic device 602 means that the wearable electronic device 602 does not have to send the image 611 over the communications 622 to be analyzed, which reduces network usage and may save time and battery 631 usage. In some examples, when the code module 630 is being executed other user interfaces are not presented, which may save battery 631 usage. The wearable electronic device 602 may enter a passive mode where the user would have to exit the code module 630 to access additional user interface options other than a physical user interface item 629 such as a button. The code module 630 may have a user interface item to exit or terminate the code module 630 such as a press of a button when the user interface item 629 is a button or a hand jester. In some examples, when the code module 630 is executing images 611, the code module 630 is configured to detect a change in the section of the reading material, e.g., a turn of the page, which terminates the code module 630 and causes another image 611 to be captured and analyzed by the code detection module 608 for codes 613.

In an offline mode of reading module 606, a target piece of reading material, e.g., a target book, may have a special code 613 that indicates that all of the code modules 630 of the target book should be downloaded to the wearable electronic device 602 so that the communications 622 does not have to be used during the reading of the target book. In some examples, the wearable electronic device 602 has an option that when a code 613 is read from a book, then the code module fetcher 610 retrieves all the code modules 630 for that book so that the communications 622 does not have to be used during the reading of the book. The communications 622 is powered off until a new book is detected or until the book mode is exited. A new book may be detected if the code 613 indicates a different book than a current book that is being read. Book is used but it is understood that other reading materials may be used.

Figure 12:
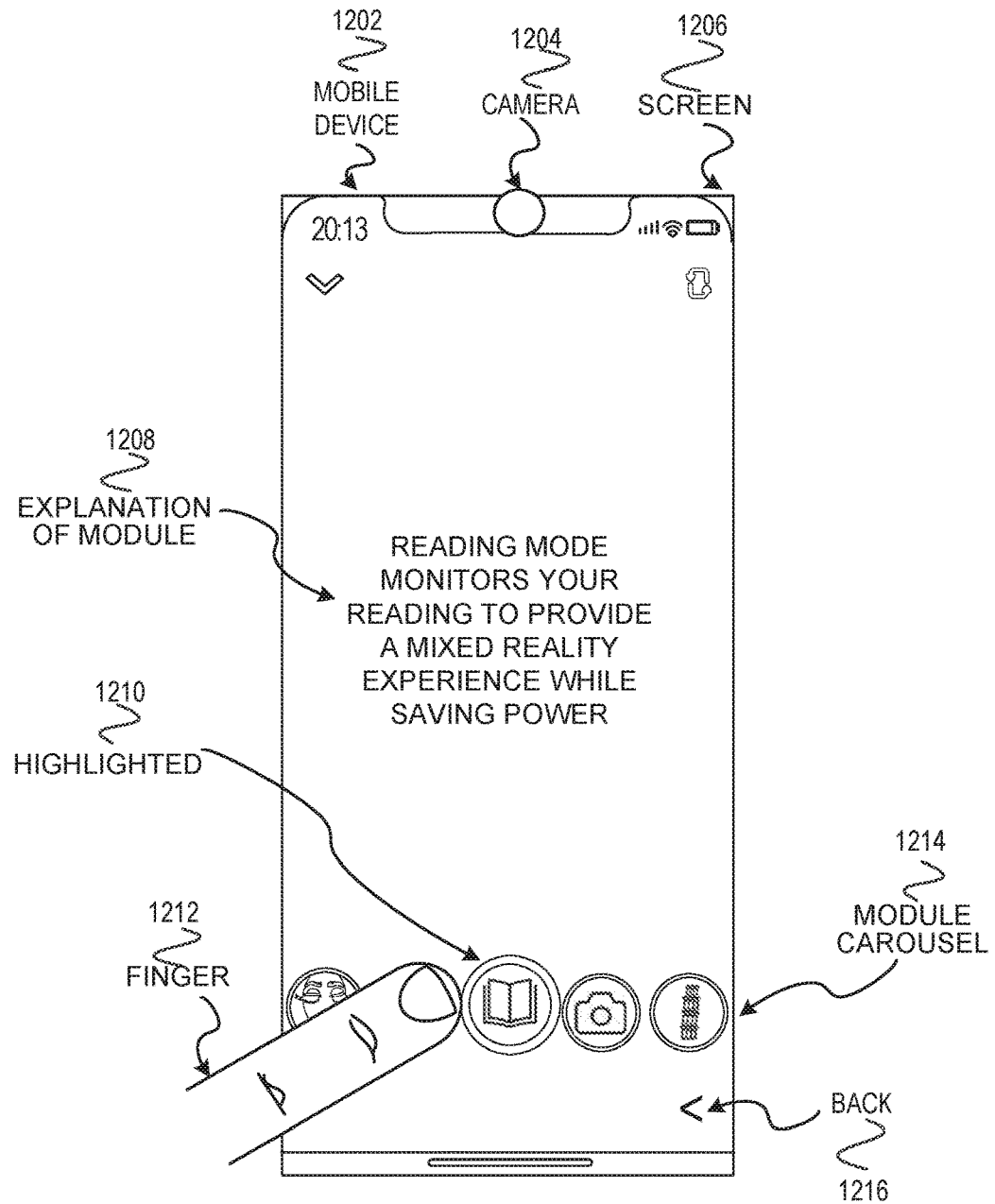
FIG. 12 illustrates a user interface for module selection, in accordance with some examples.

In some examples, the book mode of FIG. 12 may be for specific reading materials, e.g., books. For example, the highlighted 1210 may be for a specific book with a "<Book title>". The icon that is highlighted 1210 may be a special icon for a specific book. Selecting the highlighted 1210 would cause a reading module 606 to be executed that is specific to that book. The code modules 630 are loaded into the wearable electronic device 602 so that the communications 622 do not have to be used during the reading of the specific book.

The backend 604 is a server in the messaging server system 108 or a client device 102. In some examples, the backend 604 is a client device 102 that passes the communications from the wearable electronic device 602 to the server in the messaging server system 108 and sends the code modules 630 to the wearable electronic device 602. The client device 102 acts as a cache where the client device 102 recognizes that a new piece of rading material, e.g., book, is being read. The client device 102 requests all the code modules 630 from the server and acts as the backend 604. In some examples, the client device 102 acting as a cache enables a lower energy communication protocol to be used.

Figure 7:
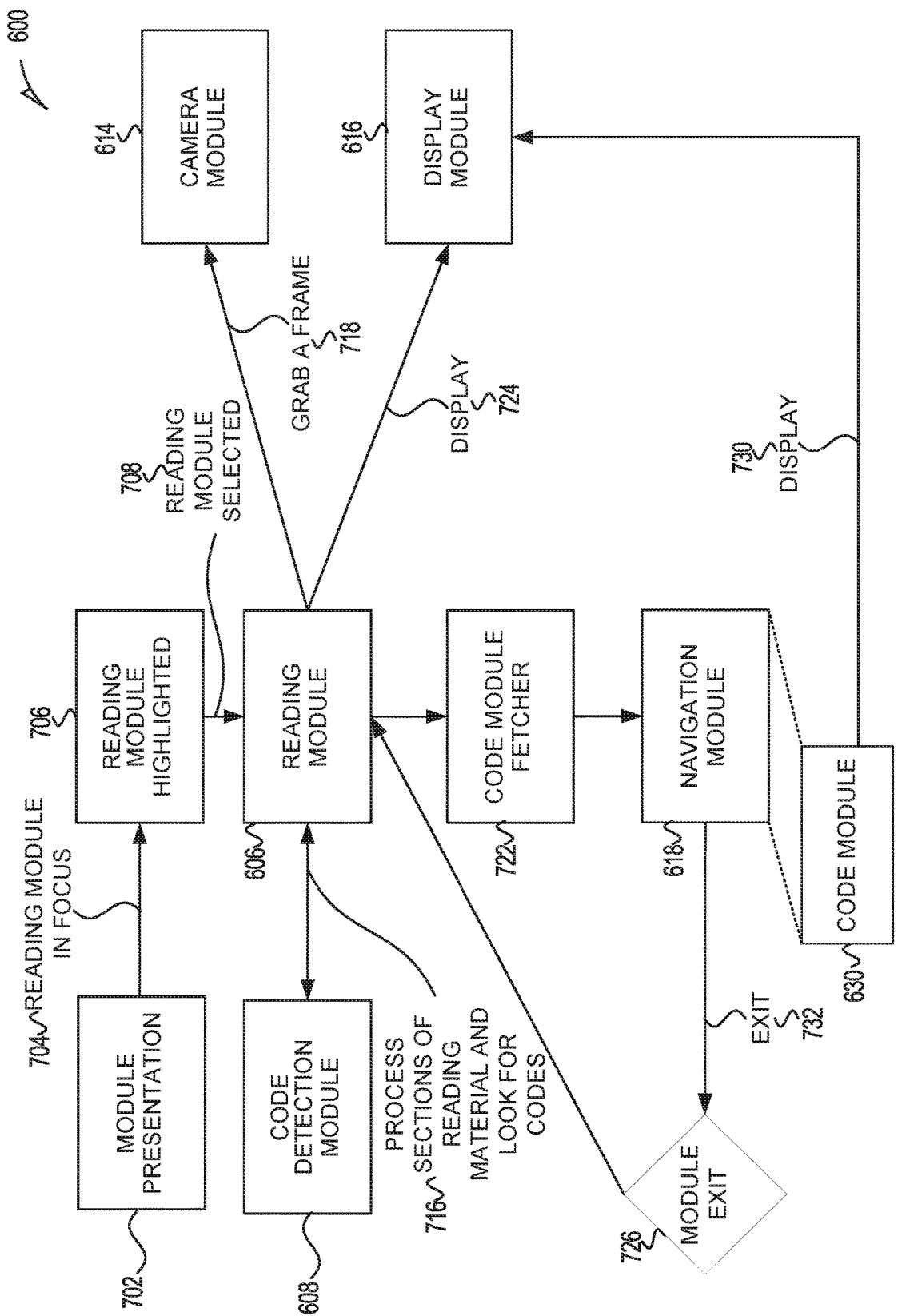
FIG. 7 illustrates a flow diagram of the operation of the wearable electronic device 602, in accordance with some examples.

FIG. 7 illustrates a flow diagram 700 of the operation of the wearable electronic device 602, in accordance with some examples. The flow diagram 700 begins with module presentation 702. The module presenter 626 presents different modules or applications from which the user may select. For example, module carousel 1214 illustrated in FIG. 12 is presented on the display 620 of a mobile device 1202. The wearable electronic device 602, e.g., AR glasses, may be paired another device such as a client device (e.g., mobile device 1202) and that the controls can be set through use of the client device, (e.g., as shown in FIG. 12). In other embodiments the controls, e.g., the module carousel 1214, is displayed on the wearable electronic device 602, e.g., displayed on the screen of the AR glasses.

The flow diagram 700 continues at reading module in focus 704. For example, the user moves the reading module 606 to the highlighted 1210 position of the module carousel 1214. The flow diagram 700 continues with the reading module highlighted 706. The flow diagram 700 continues with reading module selected 708, For example, the finger 1212 selects highlighted 1210. The flow diagram 700 continues with books module 714, which is now executing. For example, the reading module 606 may be executed by the module executor 624, which may be called by the module presenter 626 in response to the reading module 606 being selected by the finger 1212 of a user.

The flow diagram 700 continues with process sections of reading material, pages, and looks for codes 716, which is performed by the code detection module 608. For example, the sleep module 615 may have the camera module 614 capture an image 611. The code detection module 608 looks for a code 613. The reading module 606 displays 724 that a code was found using the display module 616.

The code module fetcher 722 fetches a code module 630 corresponding to the found code 613. The navigation module 618 manages the execution of the code module 630. The code module 630 uses the display module 616 to present an interactive augmented reality experience to the user. The AR module 621 is used to provide user interface items that are interactive. The module executor 624 is used by the navigation module 618 to execute the code module 630. The navigation module 618 detects that there is an exit 732 from the code module 630 and moves to a state of module exit 726 where control is returned to the reading module 606. In some examples, the reading module 606 continues to run during execution of the reading module 606. The reading module 606 captures images 611 periodically while the code module 630 executes and determines an identifier for a section of reading materials, e.g., a page number. The exit 732 is triggered by a change the identifier for the section of the reading material, e.g., in page number, being detected by the reading module 606.

Figure 8:
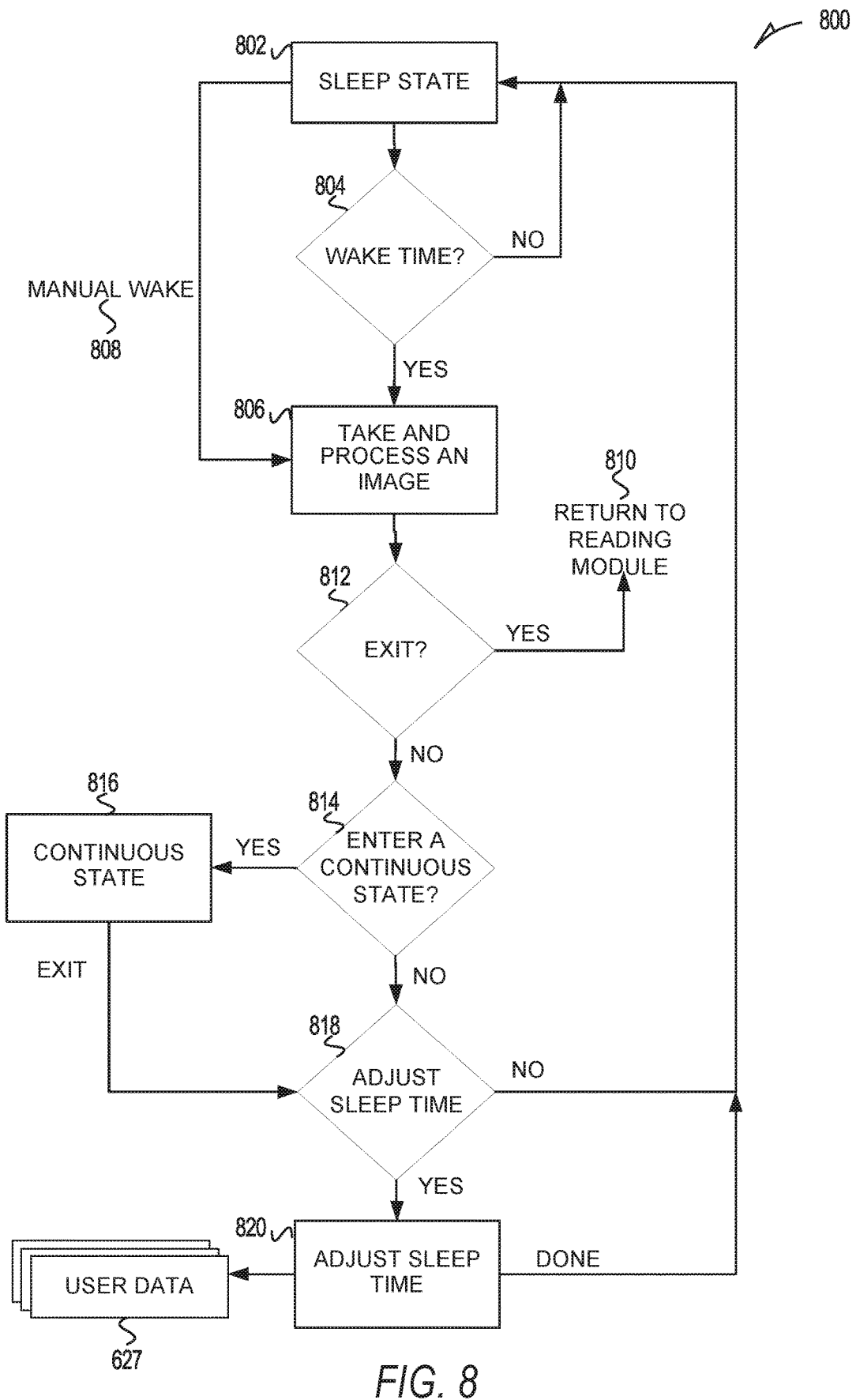
FIG. 8 illustrates a method of enhanced reading with AR glasses, in accordance with some examples.

FIG. 8 illustrates a method 800 of enhanced reading with AR glasses, in accordance with some examples. The method 800 is performed by the reading module 606 or, more specifically, the sleep module 615, in accordance with some examples. The method 800 starts in a sleep state 802 where a reading material state, e.g., a book state, is already entered. For example, the highlighted 1210 book icon is selected as illustrated in FIG. 12. The sleep state 802 periodically checks if it is a wake time 804. For example, the sleep state 802 may wake every 1 to 30 seconds. If it is not yet wake time, then sleep module 615 returns to the sleep state 802. In some examples, an interrupt is used to wake the sleep module 615 based on a time set by the sleep module 615.

If it is a wake time 804, then the sleep module 615 takes and processes an image 806 as described herein. In some examples, the sleep module 615 is awakened from a manual waken 808. For example, a user may press a button, which may be a user interface item 629.

After the take and process an image 806 state, the sleep module 615 determines whether to exit 812. For example, the image captured in take and process an image 806 may indicate that the user is no longer reading a reading material, e.g., a book. If the sleep module 615 determines to exit, then the sleep module 615 returns to the reading module 810. For example, the reading module 606 may be called to determine what action should be taken next. In some examples, if the reading module 606 determines that the identifier for the section of the reading material, a page number of page, in the image 611 is the same as a previous image, then the reading module 606 reenters the sleep state 802. In some examples, adjust sleep time 820 is performed before reentering the sleep state 802.

If the determination is not to exit, then the sleep module 615 determines whether to enter a continuous state 814, example, the image may indicate that the user is flipping through the book quickly, so the sleep module 615 determines to enter a continuous state 816 where images are captured relatively frequently such as every one second.

When the sleep module 615 determines to exit the continuous state 816, the sleep module 615 determines whether to adjust sleep time 818. For example, if the image indicates that sections of the reading material, e.g., pages, have been skipped, then the sleep module 615 may determine to adjust sleep time 820. In another example, the sleep module 615 may determine that the image is of a same page as one or more previous images and determine to adjust sleep time 820. If the sleep time is not to be adjusted, then the state returns to sleep state 802. Otherwise, the state is to adjust sleep time 820, which uses the user data 672. The sleep time may be increased or decreased based on the reading speed of the user as determined by keeping track of which page the user is on in the book based on the captured images. In some examples, the sleep time or sleep duration is adjust to an estimated time for the user to read a section of reading material, e.g., a page of the book, based on the user data 627 including page numbers of the book and timestamps of when images of the pages with the page numbers were captured. In some examples, the sleep time is increased by a fraction of a second if an image is of the same page as a previous image. In some examples, the sleep time is decreased by a fraction of a second if an image is a different image than a previous image. In this way the sleep duration is constantly being adjusted to accommodate the reading speed of the wearer of the wearable electronic device 602. In some examples the sleep duration is from one second to one-hundred and twenty seconds.

FIG. 9 illustrates a book 900 with codes, in accordance with some examples. The book 900 includes a page number 904 of page 5, an illustration of a dragon 906, and a code 902. The code 902 is identified by code detection module 608 from an image 611 captured by camera module 614. The code to code module map 609 determines a code module 630 corresponding to the identified code 902. The code module fetcher 610 retrieves the appropriate code module 630. The navigation module 618 and module executor 624 execute the code module 630. In this case the code module 630 presents a three-dimensional dragon on the display 620 of the wearable electronic device 602. The code module 630 may include a mixed reality experience where the wearer of the wearable electronic device 602 can interact with a virtual reality dragon. A book is illustrated in FIG. 9 but it is understood that other types of reading material may be used.

Figure 10:
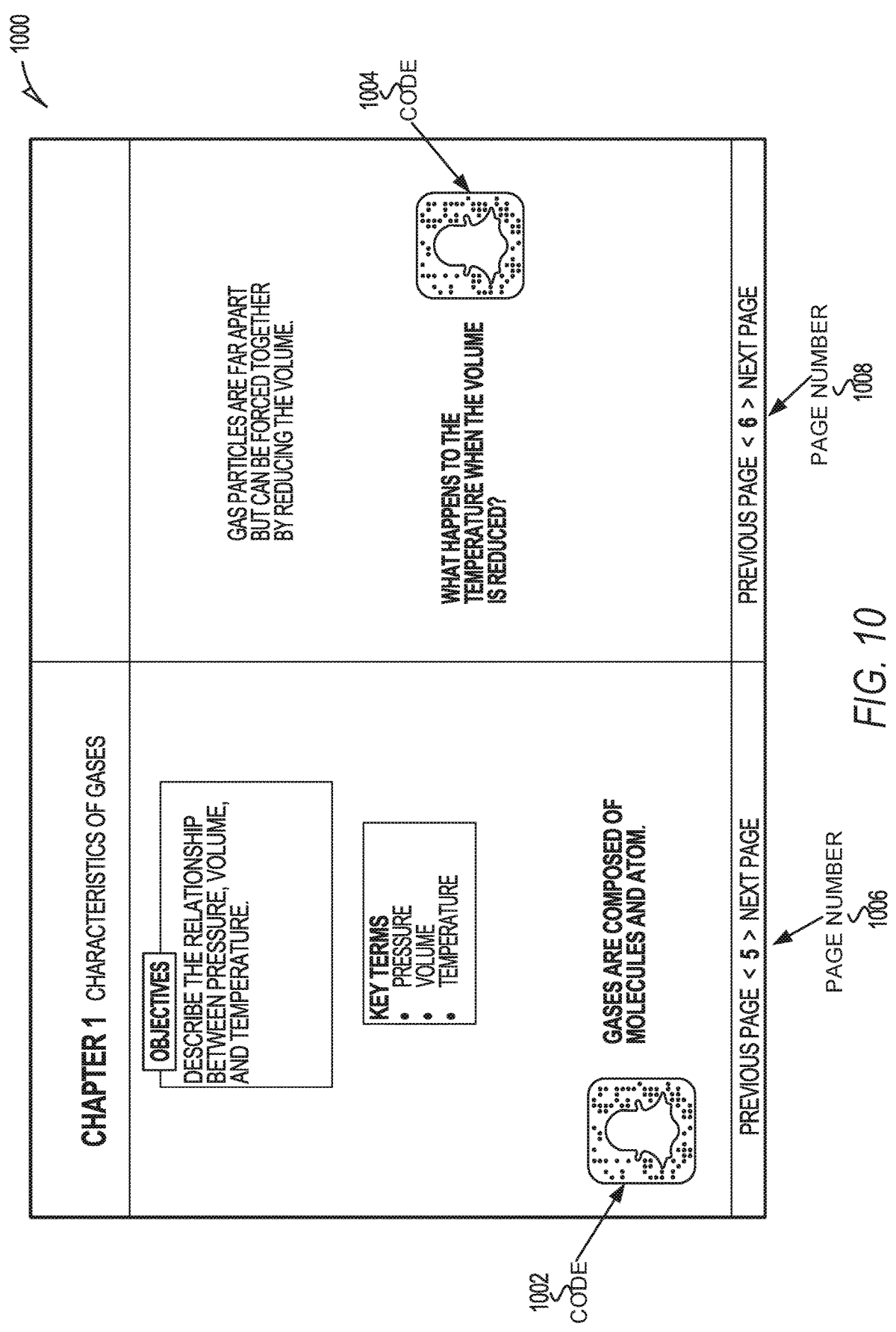

FIG. 10 illustrates a book 1000 with codes, in accordance with some examples. The book 1000 includes page number 1006 of page 5 and page number 1008 of page 6, code 1002, and code 1004. The code 1002 and code 1004 are identified by code detection module 608 from an image 611 captured by camera module 614. The code to code module map 609 determines a code module 630 corresponding to the identified code 1002 and a code module 603 corresponding to the identified code 1004. The code module fetcher 610 retrieves the appropriate code modules 630. In some examples, the code module 630 corresponding to code 1002 is executed first and then the code module 630 corresponding to code 1004. In some examples, a menu or option is presented to the wearer of the wearable electronic device 602 regarding which code module 630 the wearer would like to execute first or execute no code modules 630. The navigation module 618 and module executor 624 execute the selected code module 630. In this case the code module 630 presents further instruction to aid in the instruction of the properties of gases. The code module 630 may include a mixed reality experience where the wearer of the wearable electronic device 602 can interact with virtual reality gases. A book is illustrated in FIG. 10 but it is understood that other types of reading material may be used.

Figure 11:
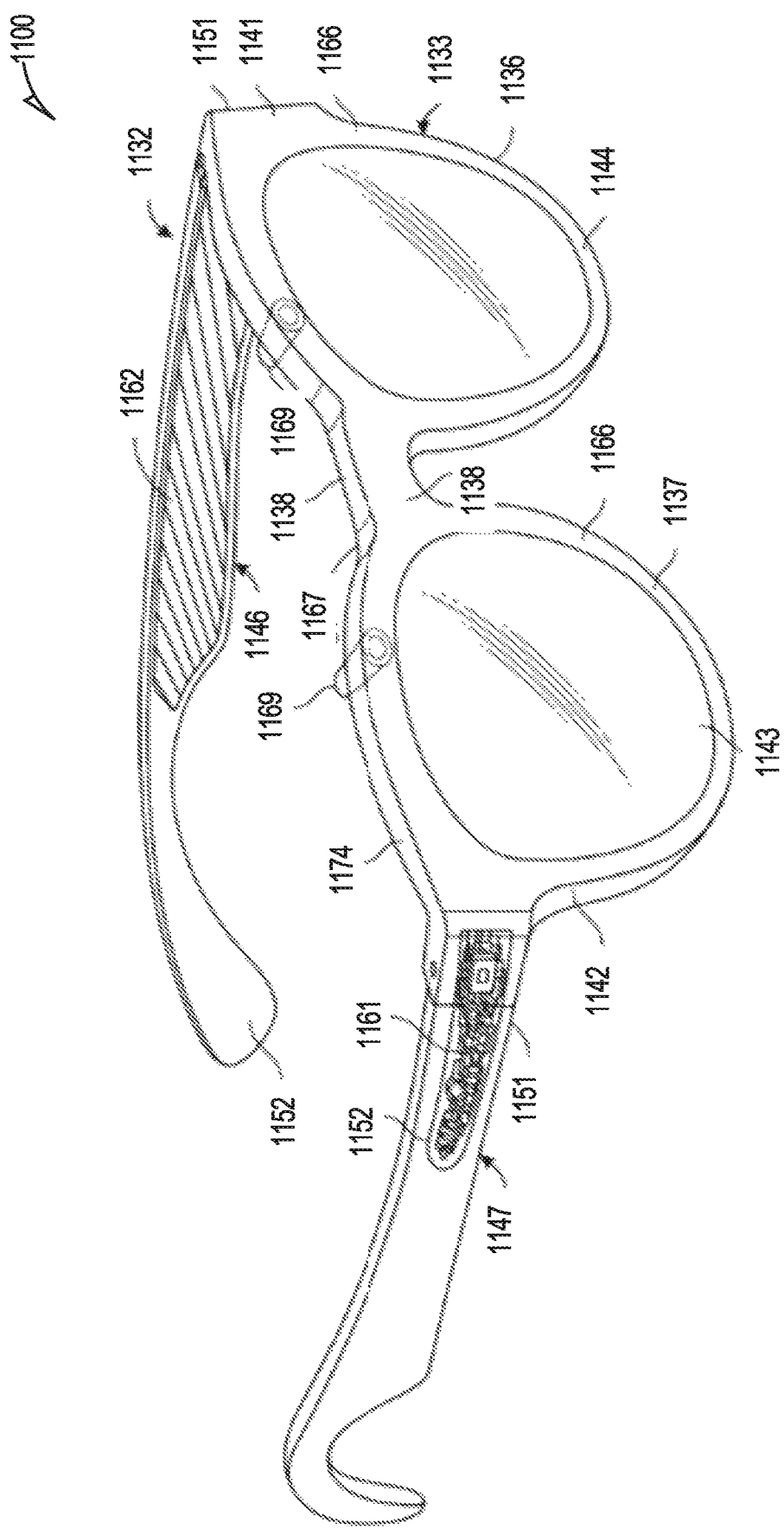
FIG. 11 illustrates examples of a wearable electronic device in the form of glasses, in accordance with some examples.

FIG. 11 illustrates examples of a wearable electronic device in the form of glasses 1100, in accordance with some examples. The wearable electronic device in the form of glasses 1100. The glasses 1110 are an article of eyewear constituted by electronics, which operate within a network system for communicating image and video content. FIG. 11 illustrates a front perspective view of the glasses 1100. In some examples, the wearable electronic device is termed AR glasses. The glasses 1100 can include a frame 1132 made from any suitable material such as plastic or metal, including any suitable shape memory alloy. The frame 1132 can have a front piece 1133 that can include a first or left lens, display, or optical element holder 1136 and a second or right lens, display, or optical element holder 1137 connected by a bridge 1138. The front piece 1133 additionally includes a left end portion 1141 and a right end portion 1142. A first or left optical element 1144 and a second or right optical element 1143 can be provided within respective left and right optical element holders 1136, 1137. Each of the optical elements 1143, 1144 can be a lens, a display, a display assembly, or a combination of the foregoing. In some examples, for example, the glasses 1100 are provided with an integrated near-eye display mechanism that enables, for example, display to the user of preview images for visual media captured by cameras 1169 of the glasses 1100.

The frame 1132 additionally includes a left arm or temple piece 1146 and a right arm or temple piece 1147 coupled to the respective left and right end portions 1141, 1142 of the front piece 1133 by any suitable means such as a hinge (not shown), so as to be coupled to the front piece 1133, or rigidly or fixedly secured to the front piece 1133 so as to be integral with the front piece 1133. Each of the temple pieces 1146 and 1147 can include a first portion 1151 that is coupled to the respective end portion 1141 or 1142 of the front piece 1133 and any suitable second portion 1152, such as a curved or arcuate piece, for coupling to the ear of the user. In one example, the front piece 1133 can be formed from a single piece of material, so as to have a unitary or integral construction. In one example, the entire frame 1132 can be formed from a single piece of material so as to have a unitary or integral construction.

The glasses 1100 include a computing device, such as a computer 1161, which can be of any suitable type so as to be carried by the frame 1132 and, in one example, of a suitable size and shape, so as to be at least partially disposed in one or more of the temple pieces 1146 and 1147. In one example, the computer 1161 has a size and shape similar to the size and shape of one of the temple pieces 1146, 1147 and is thus disposed almost entirely if not entirely within the structure and confines of such temple pieces 1146 and 1147.

In one example, the computer 1161 can be dispose in both of the temple pieces 1146, 11147. The computer 1161 can include one or more processors with memory, wireless communication circuitry, and a power source. The computer 1161 comprises low-power circuitry, high-speed circuitry, location circuitry, and a display processor. Various other examples may include these elements in different configurations or integrated together in different ways. Additional details of aspects of the computer 1161 may be implemented as described with reference to the description that follows.

The computer 1161 additionally includes a battery 1162 or other suitable portable power supply. In one example, the battery 1162 is disposed in one of the temple pieces 1146 or 1147. In the glasses 1100 shown in FIG. 11, the battery 1162 is shown as being disposed in the left temple piece 1146 and electrically coupled using a connection 1174 to the remainder of the computer 1161 disposed in the right temple piece 1147. One or more input and output devices can include a connector or port (not shown) suitable for charging a battery 1162 accessible from the outside of the frame 1132, a wireless receiver, transmitter, or transceiver (not shown), or a combination of such devices.

The glasses 1100 include digital cameras 1169. Although two cameras 1169 are depicted, other examples contemplate the use of a single or additional (i.e., more than two) cameras 1169. For ease of description, various features relating to the cameras 1169 will further be described with reference to only a single camera 1169, but it will be appreciated that these features can apply, in suitable examples, to both cameras 1169. Digital cameras 1169 are the camera 612 of FIG. 6, which may include two or more cameras.

In various examples, the glasses 1100 may include any number of input sensors or peripheral devices in addition to the cameras 1169. The front piece 1133 is provided with an outward-facing, forward-facing, front, or outer surface 1166 that faces forward or away from the user when the glasses 1100 are mounted on the face of the user, and an opposite inward-facing, rearward-facing, rear, or inner surface 1167 that faces the face of the user when the glasses 1100 are mounted on the face of the user. Such sensors can include inward-facing video sensors or digital imaging modules such as cameras 1169 that can be mounted on or provided within the inner surface 1167 of the front piece 1133 or elsewhere on the frame 1132 so as to be facing the user, and outward-facing video sensors or digital imaging modules such as the cameras 1169 that can be mounted on or provided with the outer surface 1166 of the front piece 1133 or elsewhere on the frame 1132 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 1143, 1144 (or lenses) to provide a mixed reality or augmented reality experience for the user of the glasses 1100.

The glasses 1100 further include an example of a camera control mechanism or user input mechanism comprising a camera control button mounted on the frame 1132 for haptic or manual engagement by the user. The camera control button provides a bi-modal or single-action mechanism in that it is disposable by the user between only two conditions, namely an engaged condition and a disengaged condition. In this example, the camera control button is a pushbutton that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1132 adjacent to its surface for detecting the presence of a user's finger, to dispose the touch-sensitive button to the engaged condition when the user touches a finger to the corresponding spot on the outer surface 1166 of the frame 1132. It will be appreciated that the above-described camera control button and capacitive touch button are but two examples of a haptic input mechanism for single-action control of the camera 1169, and that other examples may employ different single-action haptic control arrangements.

The computer 1161 is configured to perform the methods described herein. The computer 1161 is an example of a wearable electronic device 602, in accordance with some examples. In some examples, the computer 1161 is coupled to one or more antennas for reception of signals from a GNSS and circuitry for processing the signals where the antennas and circuitry are housed in the glasses 1100. In some examples, the computer 1161 is coupled to one or more wireless antennas and circuitry for transmitting and receiving wireless signals where the antennas and circuitry are housed in the glasses 1100. In some examples, there are multiple sets of antennas and circuitry housed in the glasses 1100. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors are housed in glasses 1100 and coupled to the computer 1161. In some examples, the glasses 1100 are VR headsets.

FIG. 12 illustrates a user interface 1200 for module selection, in accordance with some examples. Illustrated is a mobile device 1202 with a camera 1204 and screen 1206. A module for the wearable electronic device 602 is being selected on the mobile device 1202, which may be a client device 102. The module carousel 1214 is a user interface item where modules that are available for the user to select may be scrolled through by swiping the finger 1212. The module in the center is highlighted. Here the reading mode, e.g., a book mode, is in the center of the carousel and is highlighted 1210. The highlighted 1210 module has an explanation of the module highlighted 1210, which here is plain text. The explanation of module 1208 may be an animation, an image, text, an interactive mixed reality experience, or something else to explain the functions of the highlighted 1210 module. The mobile device 1202 accepts the selection of the book mode and sends it to the wearable electronic device 602. In some examples, the wearable electronic device 602 presents the user interface 1200. For example, the module carousel 1214 may be a mixed reality or virtual reality user interface item and the finger 1212 may be a rendered image of the user's finger. The back interface item 1216 exits the user interface 1200.

Figure 13:
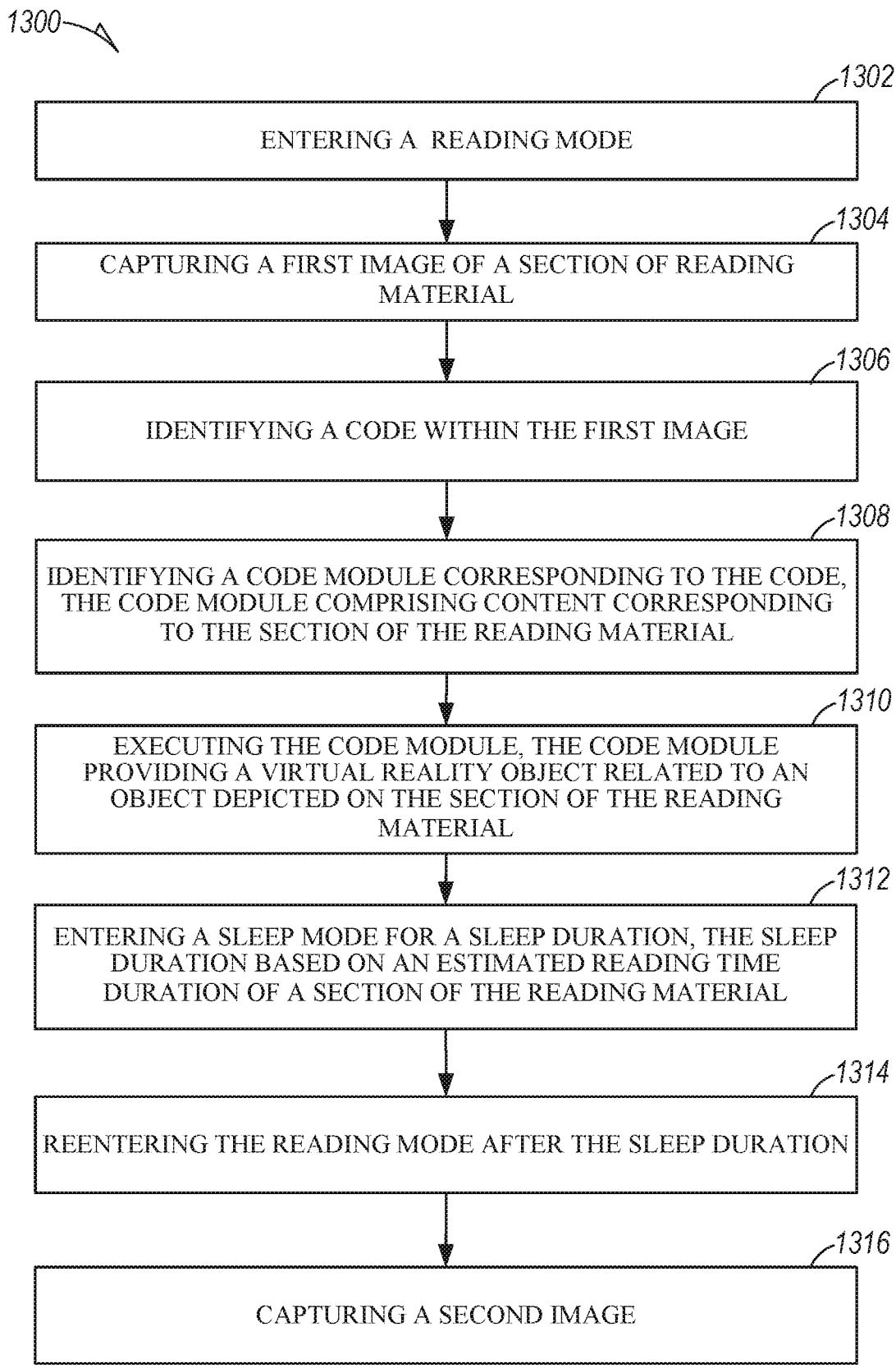
FIG. 13 illustrates a method for enhanced reading with AR glasses, in accordance with some examples.

FIG. 13 illustrates a method 1300 for enhanced reading with AR glasses, in accordance with some examples. The method 1300 at operation 1302 with entering a reading mode. For example, referring to FIG. 7, when reading module is selected 708, then the reading mode, e.g., book mode, is entered and the wearable electronic device 602 runs the reading module 606. The method 1300 continues at operation 1304 with capturing a first image of a section of reading material. For example, the camera module 614 causes the camera 612 to capture an image 611 such as book 1000. The method 1300 continues at operation 1306 with identifying a code within the first image. For example, code detection module 608 detects code 613 within the image 611 such as with the image 611 being book 1000 and the code 613 being code 1002.

The method 1300 continues at operation 1308 with identifying a code module corresponding to the code where the code module includes content corresponding to the section of the reading material. For example, code to code module map 609 takes the code 613 and maps it to a corresponding code module 630. The code module fetcher 610 fetches the corresponding code module 630. For example, for code 1002 of FIG. 10, then the code module 630 is a code module that provides a mixed reality experience for learning about the property of gases.

The method 1300 continues at operation 1310 with executing the code module where the code module provides a virtual reality object related to an object depicted on the section of the reading materials, e.g., the page of the book. For example, module executor 624 with the navigation module 618 executes the corresponding code module 630 to provide the mixed reality experience of the gases.

The method 1300 continues at operation 1312 entering a sleep mode for a sleep duration where the sleep duration is based on an estimated reading time duration of a section not reading material, e.g., a page of the book. For example, a time duration may have passed where the user was inactive with the code module 630, the user may have turned to a different section of the reading materials, e.g., turned the page of the book, or the user may provide an explicit user input such as a hand wave to terminate the code module 630.

The method 1300 continues at operation 1314 with reentering the reading mode after the sleep duration. The sleep module 615 places the wearable electronic device 602 into a sleep state 802 upon termination of the code module 630. The method continues at operation 1316 with capturing a second image. For example, the sleep module 615 wakes up the wearable electronic device 602 and begins the process anew by capturing a new image 611 to determine if a section of the reading material, e.g., page, change has occurred and whether codes 613 are included in the image 611.

The method 1300 may include one or more additional operations. Operations of method 1300 may be performed in a different order. One or more of the operations of method 1300 may be optional. The method 1300 may be performed by the client device 102, VR wearable electronic device 602, and/or the wearable electronic device in the form of VR glasses 1100. Portions of the functionality may be performed on a server computer or host computer.

The term book may be used as an exemplary but it should be understood that other reading material may be used such as news papers, menus, magazines, pamphlets, instructions, mail, and so forth. The term page may be used as an exemplary but it should be understood that other sections of reading material may be used such as a leaf of a menu, a portion of a billboard, and so forth. The term page is being used to represent a section of a reading materials that a user may be attentive to.

Machine Architecture

Figure 14:
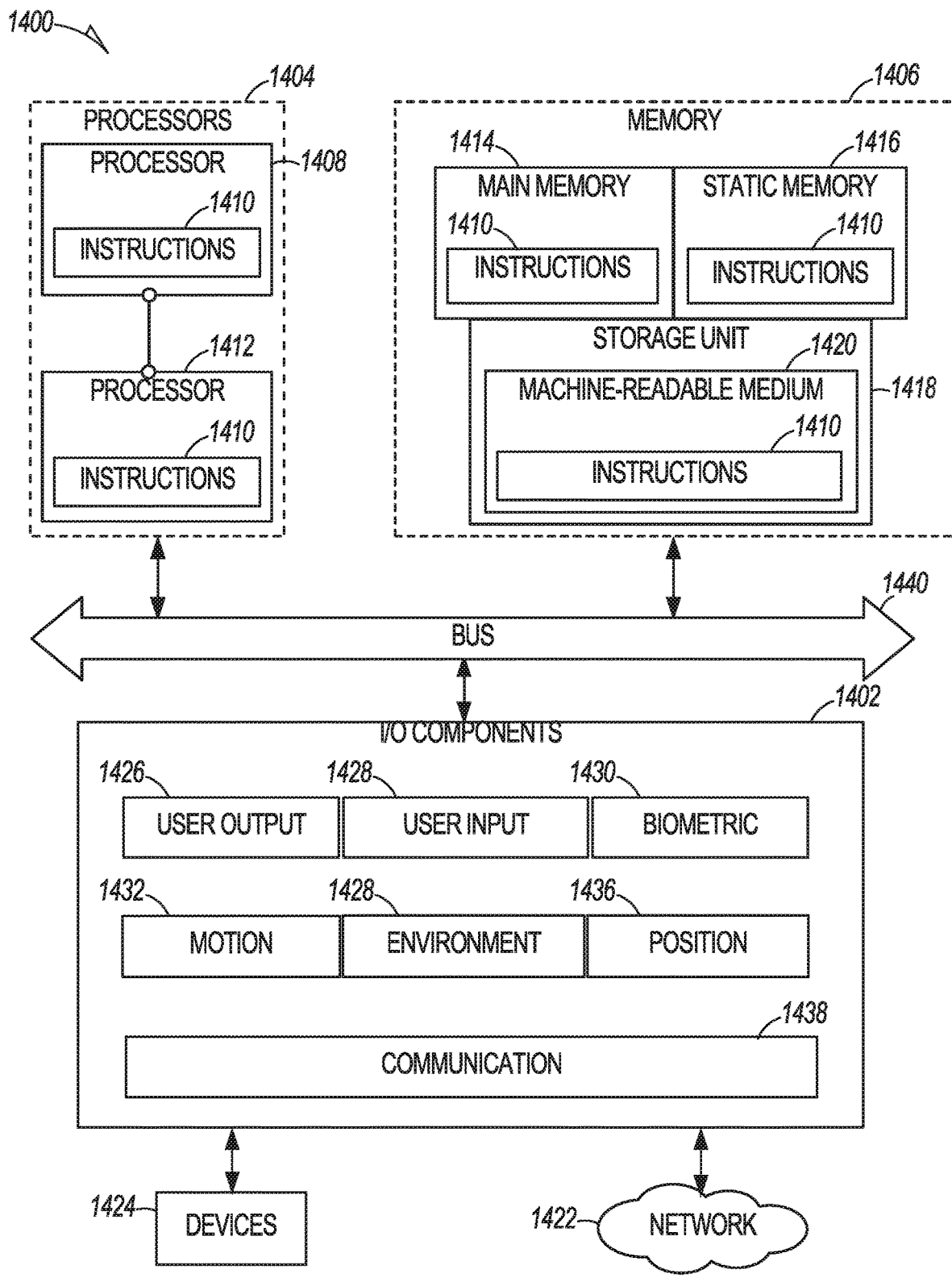
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NEC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
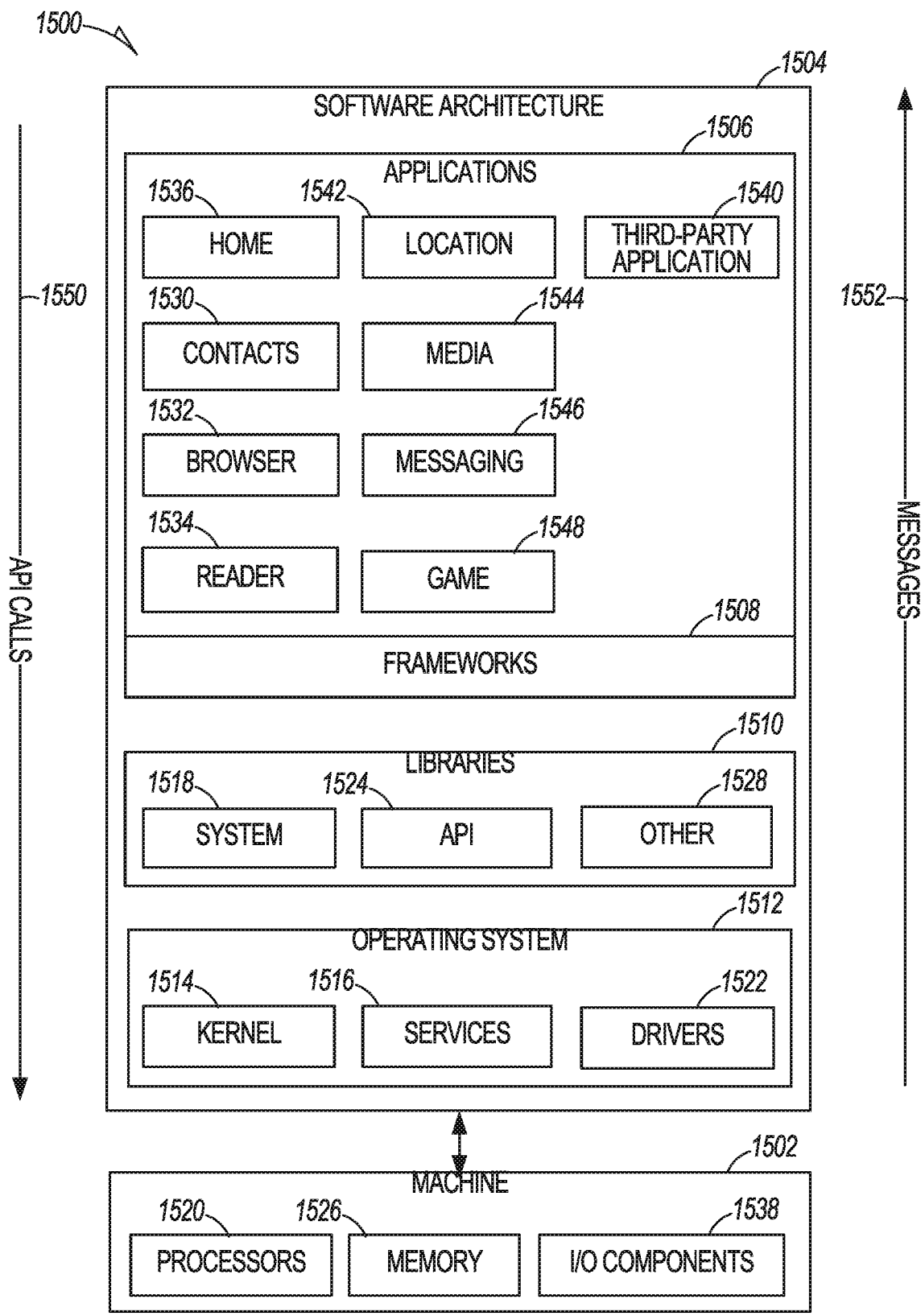
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers, example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
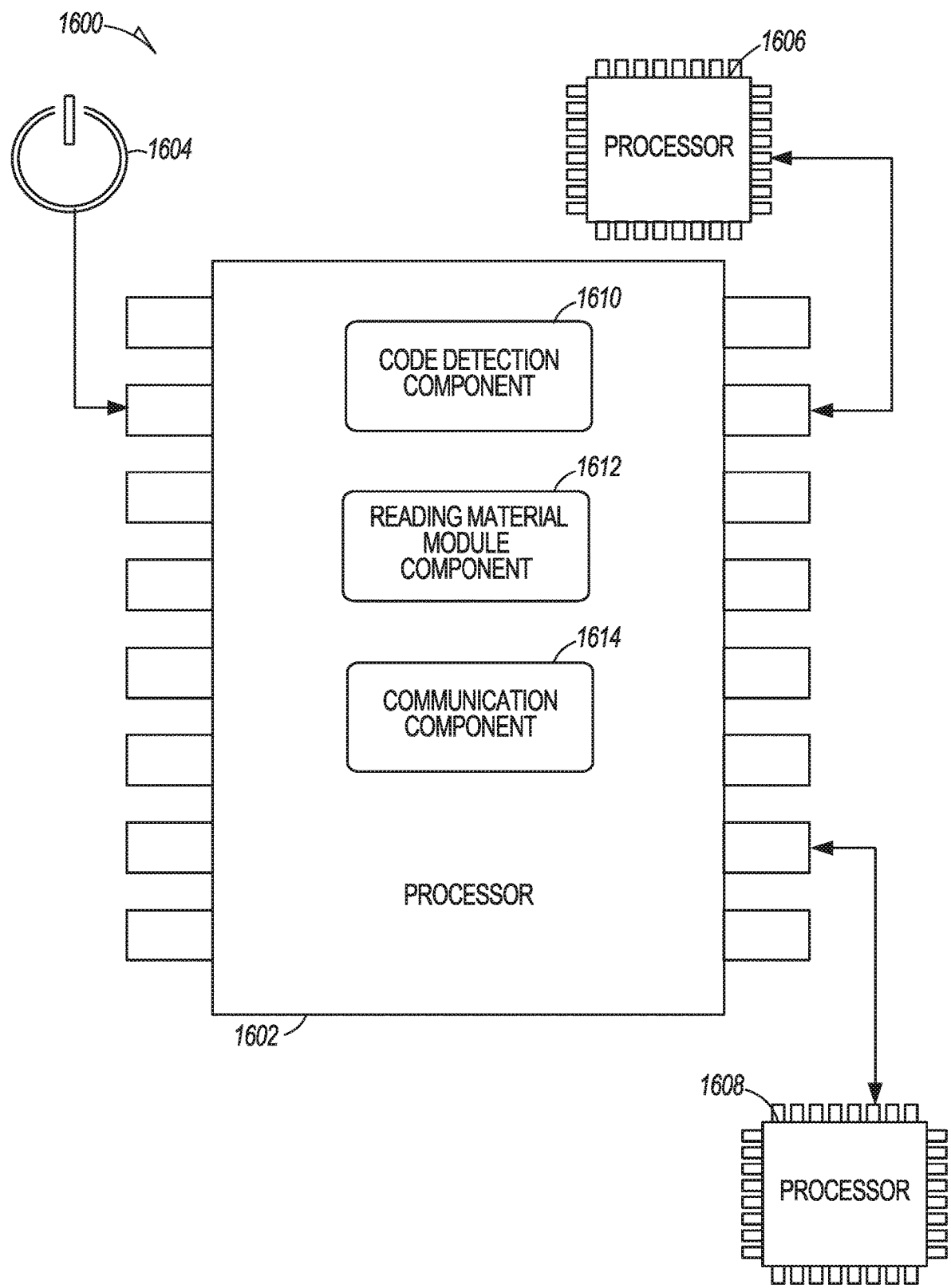
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely a code detection component 1610, reading material component 1612, and a communication component 1614. The code detection component 1610 detects codes in images 611. Referring to FIG. 6, the code detection component 1610 performs the functions associated with the code detection module 608.

The reading material module component 1612 performs the functions associated with providing enhanced AR for reading. The reading module component 1612 performs the functions associated with the reading module 606 of FIG. 6. The communication component 1614 is coupled to communications hardware and is configured to implement communication protocols. The communications component 1614 performs functions associated with communications 622. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, an AR glasses, a VR glasses, an AR wearable device, a desktop computer, a laptop, a portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method performed on a augmented reality (AR) wearable electronic device, the method comprising:
   entering a reading mode;
   capturing a first image of a section of reading material;
   identifying a code within the first image;
   identifying a code module corresponding to the code, the code module comprising content corresponding to the section of the reading material;
   executing the code module, the code module providing an augmented reality object related to an object depicted on the section of the reading material;
   entering a sleep mode for a sleep duration, the sleep duration based on an estimated reading time duration of the section of the reading material;
   reentering the reading mode after the sleep duration; and
   capturing a second image.

2. The method of claim 1 wherein the section is a page and the reading material is a book.

3. The method of claim 1 wherein entering the sleep mode comprises:
   causing wireless communication processing circuitry of the AR wearable electronic device to enter a low-energy consumption mode;
   causing camera hardware of the AR wearable electronic device to enter a low-energy consumption mode; and
   causing display hardware of the AR wearable electronic device to enter a low-energy consumption mode.

4. The method of claim 1 wherein entering the book reading mode comprises:
   refraining from turning on display hardware unless the code is identified or a physical user interface item is selected.

5. The method of claim 1 wherein the section is a first page and wherein the method further comprises:
   identifying a second page within the second image; and
   reentering the sleep mode when the first page and the second page are a same page.

6. The method of claim 1 further comprising:
   retrieving the code module from a backend server via a low-energy wireless communications protocol.

7. The method of claim 1 further comprising:
   in response to the code identifying the reading material, retrieving a plurality of code modules including the code module from a backend server via wireless communication processing circuitry, the plurality of code modules corresponding to a plurality of codes contained within the reading material;
   powering down the wireless communication processing circuitry; and
   in response to leaving the reading mode or detecting a new reading material, powering up the wireless communication processing circuitry.

8. The method of claim 1 wherein the sleep duration is from one second to one-hundred and twenty seconds.

9. The method of claim 1 wherein the page is a first page and wherein the method further comprises:
   identifying a second page within the second image;
   increasing the sleep duration when the first page and the second page are a same page; and
   decreasing the sleep duration when the first page and the second page are different pages.

10. The method of claim 8 wherein the sleep duration is increased or decreased by a fraction of a second.

11. The method of claim 1 further comprising:
    storing a number of the section with a time in a user data storage on the VR wearable electronic device; and
    adjusting the sleep duration based on a plurality of numbers of sections of the reading material associated with a plurality of times.

12. The method of claim 1 further comprising:
    determining the second image is of a different piece of reading material; and
    exiting the reading mode.

13. The method of claim 1 wherein entering the sleep mode further comprises:
    in response to a hand gesture by a wearer of the AR wearable electronic device, entering the sleep mode for the sleep duration, the sleep duration based on a reading time duration of the page of the book.

14. The method of claim 1 further comprising:
    refraining from displaying user interface items for invoking functions of the AR wearable electronic device outside of the reading mode, during the executing the code module.

15. The method of claim 1 wherein the AR wearable electronic device is a mixed reality wearable electronic device.

16. An augmented reality (AR) wearable electronic device comprising:
    one or more processors; and
    one or more memories storing instructions that, when executed by the one or more processors, configure the VR wearable electronic device to perform operations comprising:
    entering a reading mode;
    capturing a first image of a section of reading material;
    identifying a code within the first image;
    identifying a code module corresponding to the code, the code module comprising content corresponding to the section of the reading material;
    executing the code module, the code module providing an augmented reality object related to an object depicted on the section of the reading material;
    entering a sleep mode for a sleep duration, the sleep duration based on an estimated reading time duration of the section of the reading material;
    reentering the reading mode after the sleep duration; and
    capturing a second image.

17. The AR wearable electronic device of claim 16 wherein the section is a page and the reading material is a book.

18. The AR wearable electronic device of claim 16 wherein entering the sleep mode comprises:
    causing wireless communication processing circuitry of the AR wearable electronic device to enter a low-energy consumption mode;
    causing camera hardware of the AR wearable electronic device to enter a low-energy consumption mode; and
    causing display hardware of the AR wearable electronic device to enter a low-energy consumption mode.

19. A non-transitory computer-readable storage medium, the computer-readable storage medium including instructions that when executed by a virtual reality (VR) or augmented reality (AR) wearable electronic device, cause the VR wearable electronic device to perform operations comprising:
  entering a reading mode;
  capturing a first image of a section of reading material;
  identifying a code within the first image;
  identifying a code module corresponding to the code, the code module comprising content corresponding to the section of the reading material;
  executing the code module, the code module providing a virtual reality or augmented reality object related to an object depicted on the section of the reading material;
  entering a sleep mode for a sleep duration, the sleep duration based on an estimated reading time duration of the section of the reading material;
  reentering the reading mode after the sleep duration; and
  capturing a second image.

20. The non-transitory computer-readable storage medium of claim 1 wherein the section is a page and the reading material is a book, and wherein wherein entering the sleep mode comprises:
  causing wireless communication processing circuitry of the AR wearable electronic device to enter a low-energy consumption mode;
  causing camera hardware of the AR wearable electronic device to enter a low-energy consumption mode; and
  causing display hardware of the AR wearable electronic device to enter a low-energy consumption mode.

* * * * *